(12) United States Patent
Wassermann et al.

(10) Patent No.: US 8,013,756 B2
(45) Date of Patent: Sep. 6, 2011

(54) ESTIMATION OF PROPERTIES OF MUD

(75) Inventors: Ingolf Wassermann, Hannover (DE);
Hanno Reckmann, Nienhagen (DE);
Michael Neubert, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 951 days.

(21) Appl. No.: 11/763,712

(22) Filed: Jun. 15, 2007

(65) Prior Publication Data

US 2008/0002524 A1 Jan. 3, 2008

Related U.S. Application Data

(60) Provisional application No. 60/814,988, filed on Jun. 20, 2006, provisional application No. 60/814,124, filed on Jun. 16, 2006.

(51) Int. Cl.
*H04H 9/00* (2006.01)

(52) U.S. Cl. .............. 340/854.3; 340/853.2; 340/855.7; 340/3; 340/856.4; 340/855.4; 340/855.5; 340/855.6; 367/82; 367/83

(58) Field of Classification Search .............. 340/853.2, 340/855.7, 854.3, 856.4, 855.5, 855.6; 367/82, 367/83
See application file for complete search history.

(56) References Cited

U.S. PATENT DOCUMENTS

| | | | |
|---|---|---|---|
| 3,716,830 A * | 2/1973 | Garcia | 367/83 |
| 3,742,443 A * | 6/1973 | Foster et al. | 367/83 |
| 3,747,059 A | 7/1973 | Garcia | 340/18 LD |
| 4,262,343 A * | 4/1981 | Claycomb | 367/83 |
| 4,590,593 A * | 5/1986 | Rodney | 367/83 |
| 4,642,800 A * | 2/1987 | Umeda | 367/85 |
| 4,692,911 A * | 9/1987 | Scherbatskoy | 367/83 |
| 4,715,022 A * | 12/1987 | Yeo | 367/83 |
| 5,113,379 A * | 5/1992 | Scherbatskoy | 367/83 |
| 5,146,433 A | 9/1992 | Kosmala et al. | 367/83 |
| 5,969,638 A * | 10/1999 | Chin | 340/855.3 |
| 6,370,082 B1 * | 4/2002 | Gardner et al. | 367/82 |
| 6,626,253 B2 * | 9/2003 | Hahn et al. | 175/48 |
| 6,741,185 B2 * | 5/2004 | Shi et al. | 340/853.2 |
| RE38,567 E | 8/2004 | Gruenhagen | 340/679 |
| 7,324,010 B2 * | 1/2008 | Gardner et al. | 340/854.4 |
| 7,423,550 B2 * | 9/2008 | Reckmann et al. | 340/855.7 |
| 2006/0132327 A1 | 6/2006 | Reckmann et al. | |

FOREIGN PATENT DOCUMENTS

| | | |
|---|---|---|
| GB | 2066989 A | 7/1981 |
| GB | 2147722 A | 5/1985 |
| GB | 2355739 A | 5/2001 |
| GB | 2361789 A | 10/2001 |

* cited by examiner

*Primary Examiner* — Brian A Zimmerman
*Assistant Examiner* — Amine Benlagsir
(74) *Attorney, Agent, or Firm* — Mossman Kumar & Tyler PC (57) ABSTRACT

Measurements made with at least two sensors (flow rate or pressure) during generation of a message concurrently with operation of a noise source are used to estimate a channel transfer function. The estimated transfer function is then used to attenuate pump noise in a mud pulse telemetry system. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

20 Claims, 7 Drawing Sheets

ESTIMATION OF PROPERTIES OF MUD

CROSS-REFERENCES TO RELATED APPLICATIONS

This application claims priority from U.S. Provisional Patent Application Ser. No. 60/814,988 filed on Jun. 20, 2006, and from U.S. Provisional Patent application Ser. No. 60/814,124 filed on Jun. 16, 2006.

BACKGROUND OF THE DISCLOSURE

1. Field of the Disclosure

The present disclosure relates to telemetry systems for communicating information from a downhole location to a surface location, and, more particularly, to a method of removing noise at the surface location produced by surface sources.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameter include logging data such as resistivity of the various layers, sonic density, porosity, induction, self potential and pressure gradients. This information is critical to efficiency in the drilling operation.

MWD Telemetry is required to link the downhole MWD components to the surface MWD components in real-time, and to handle most drilling related operations without breaking stride. The system to support this is quite complex, with both downhole and surface components that operate in step.

In any telemetry system there is a transmitter and a receiver. In MWD Telemetry the transmitter and receiver technologies are often different if information is being up-linked or down-linked. In up-linking, the transmitter is commonly referred to as the Mud-Pulser (or more simply the Pulser) and is an MWD tool in the BHA that can generate pressure fluctuations in the mud stream. The surface receiver system consists of sensors that measure the pressure fluctuations and/or flow fluctuations, and signal processing modules that interpret these measurements.

Down-linking is achieved by either periodically varying the flow-rate of the mud in the system or by periodically varying the rotation rate of the drillstring. In the first case, the flow rate is controlled using a bypass-actuator and controller, and the signal is received in the downhole MWD system using a sensor that is affected by either flow or pressure. In the second case, the surface rotary speed is controlled manually, and the signal is received using a sensor that is affected.

For uplink telemetry, a suitable pulser is described in U.S. Pat. No. 6,626,253 to Hahn et al., having the same assignee as the present application and the contents of which are fully incorporated herein by reference. Described in Hahn '253 is an anti-plugging oscillating shear valve system for generating pressure fluctuations in a flowing drilling fluid. The system includes a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced data encoding.

US RE38,567 to Gruenhagen et al., having the same assignee as the present disclosure and the contents of which are fully incorporated herein by reference, and U.S. Pat. No. 5,113,379 to Scherbatskoy teach methods of downlink telemetry in which flow rate is controlled using a bypass-actuator and controller.

Drilling systems (described below) include mud pumps for conveying drilling fluid into the drillstring and the borehole. Pressure waves from surface mud pumps produce considerable amounts of noise. The pump noise is the result of the motion of the mud pump pistons. The pressure waves from the mud pumps travel in the opposite direction from the uplink telemetry signal. Components of the noise waves from the surface mud pumps may be present in the frequency range used for transmission of the uplink telemetry signal and may even have a higher level than the received uplink signal, making correct detection of the received uplink signal very difficult. Additional sources of noise include the drilling motor and drill bit interaction with the formation. All these factors degrade the quality of the received uplink signal and make it difficult to recover the transmitted information.

There have been numerous attempts to find solutions for reducing interfering effects in MWD telemetry signals. See, for example, U.S. Pat. Nos. 3,747,059 and 3,716,830 to Garcia; U.S. Pat. No. 3,742,443 to Foster et al. U.S. Pat. No. 4,262,343 to Claycomb, U.S. Pat. No. 4,590,593 to Rodney, U.S. Pat. No. 4,642,800 issued to Umeda, U.S. Pat. No. 5,146,433 to Kosmala et al., U.S. Pat. No. 4,715,022 to Yeo, U.S. Pat. No. 4,692,911 to Scherbatskoy, and U.S. Pat. No. 5,969,638 to Chin.

All the aforementioned prior art systems are attempting to find a successful solution that would eliminate a substantial portion or all of the mud pump noise measured by transducers at the surface and, in so doing, improve reception of telemetry signals transmitted from downhole. Some of these systems also attempt to account for reflected waves traveling back in the direction of the source of the original waves. However, none provide means for substantially reducing mud pump noise while also dealing with distortion caused by the mud channel and reflected waves.

GB 2361789 to Tennent et al. teaches a receiver and a method of using the receiver for use with a mud-pulse telemetry system. In essence, Tennent determines a transfer function for the mud channel in both directions. Determination of these transfer functions is difficult when both the mud pump and the downhole pulser are operating. The present disclosure addresses this difficulty with a simple solution.

SUMMARY OF THE DISCLOSURE

One embodiment of the disclosure is a method of communicating a signal through a fluid in a borehole between a first location and a second location. The method includes measuring signals in the fluid at least two spaced apart positions at or near the second location in response to operation of a noise source and generation of a first message at a first time. Additional signal are measured in the fluid at the two positions in response to operation of the noise source and generation of the first message at a second time. A characteristic of the fluid between the first location and a second location is estimated from the measured signals and the additional measured signals. The first message may be generated at the first location. The method may further include generating a message signal at the first location simultaneously with the operation of the noise source at a third time, measuring more additional signals in the fluid at the two positions, and using the more additional signals and the estimate of the characteristic for estimating the message signal. The signals at the two locations may be pressure signals and/or flow rate signals. The characteristic of the fluid may be a transfer function between the at least two spaced apart positions. Generating the first message may include generating a swept-frequency signal. Generating the message signal may further include using amplitude shift keying, frequency shift keying and/or phase shift keying. The method may further include conveying a source of the first message on a bottomhole assembly conveyed on a drilling tubular.

Another embodiment of the disclosure is a system for communicating a signal through a fluid in a borehole between a first location and a second location. The system includes sensors in the fluid at least two spaced apart positions at or near the second location. The sensors are configured to measure signals in response to operation of a noise source and generation of a first message by a message source at a first time, and measure additional signals in the fluid in response to operation of the noise source and generation of the first message by the message source at a second time. The system also includes a processor configured to estimate a characteristic of the fluid between the first location and a second location from the measured signals and the additional measured signals, and record the estimated characteristic on a suitable medium. The message source may be at the first location. The message source may be further configured to generate a message signal simultaneously with the operation of the noise source at a third time, the sensors may be configured to measure more additional signals in the fluid at the two locations, and the processor may be configured to use the more additional signals and the estimated characteristic for estimating the message signal. The sensors may be configured to be responsive to pressure signals and/or flow rate signals. The characteristic of the fluid may be a transfer function between the two positions. The first message may be a swept-frequency signal. The message signal may further include amplitude shift keying, frequency shift keying, and/or phase shift keying. The message source may be on a bottomhole assembly conveyed on a drilling tubular. The message source may include an oscillating shear valve. The noise source may be a pump.

Another embodiment of the disclosure is a computer-readable medium for use with a system for communicating a signal through a fluid in a borehole between a first location and a second location. The system includes sensors in the fluid at least two spaced apart positions at or near the second location. The sensors are configured to measure signals in response to operation of a noise source and generation of a first message by a message source at a first time, and measure additional signals in the fluid in response to operation of the noise source and generation of the first message by the message source at a second time. The medium includes instructions which enable a processor to estimate a characteristic of the fluid between the first location and a second location from the measured signals and the additional measured signals, and record the estimated characteristic on a suitable medium. The machine readable medium may include a ROM, an EPROM, an EAROM, a Flash Memory, and/or an Optical disk.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Figure 1:
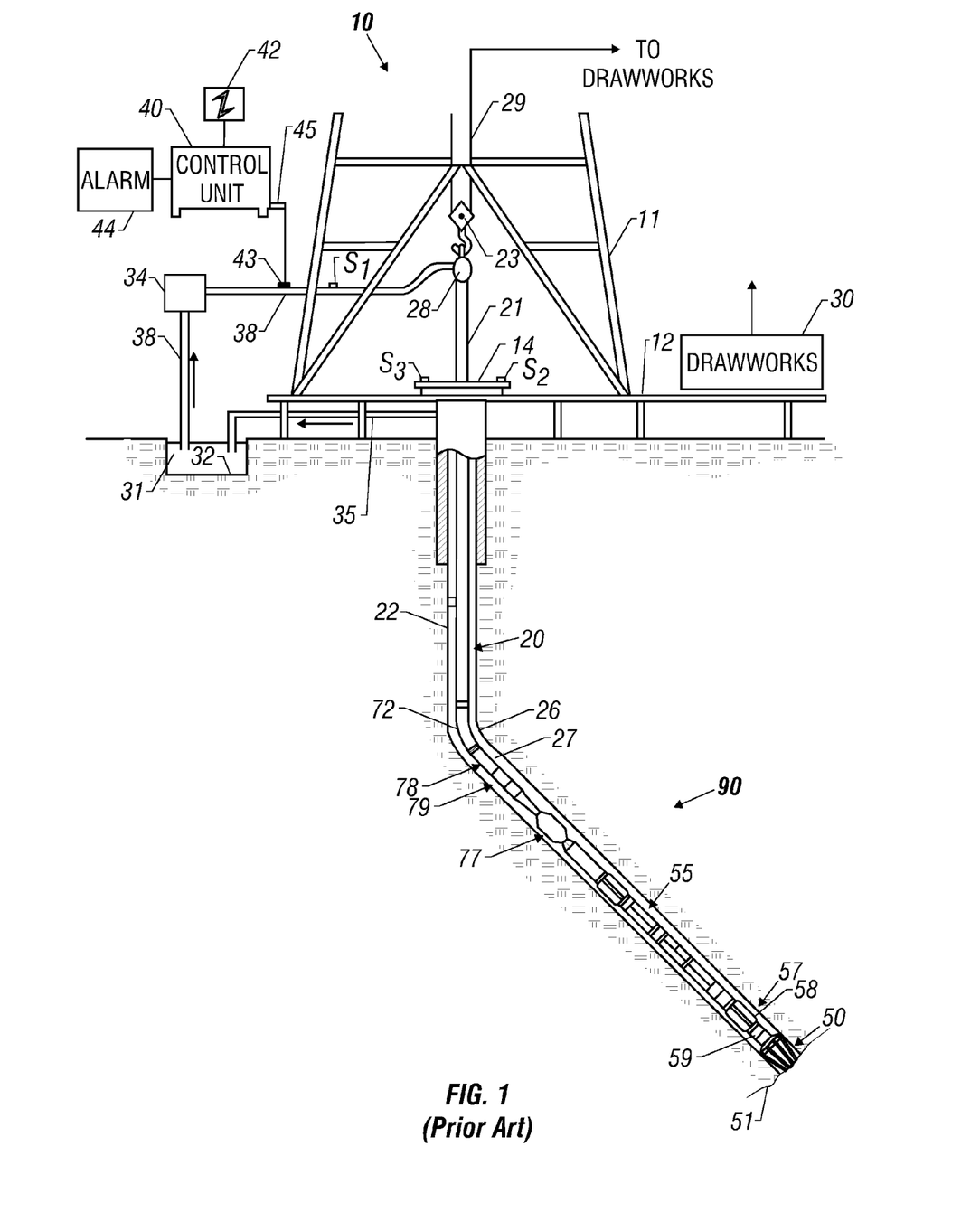
FIG. 1 (prior art) is a schematic illustration of a drilling system suitable for use with the present disclosure.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown)

disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The system also includes a downhole processor, sensor assembly for making formation evaluation and an orientation sensor. These may be located at any suitable position on the bottom hole assembly (BHA).

Figure 2A:
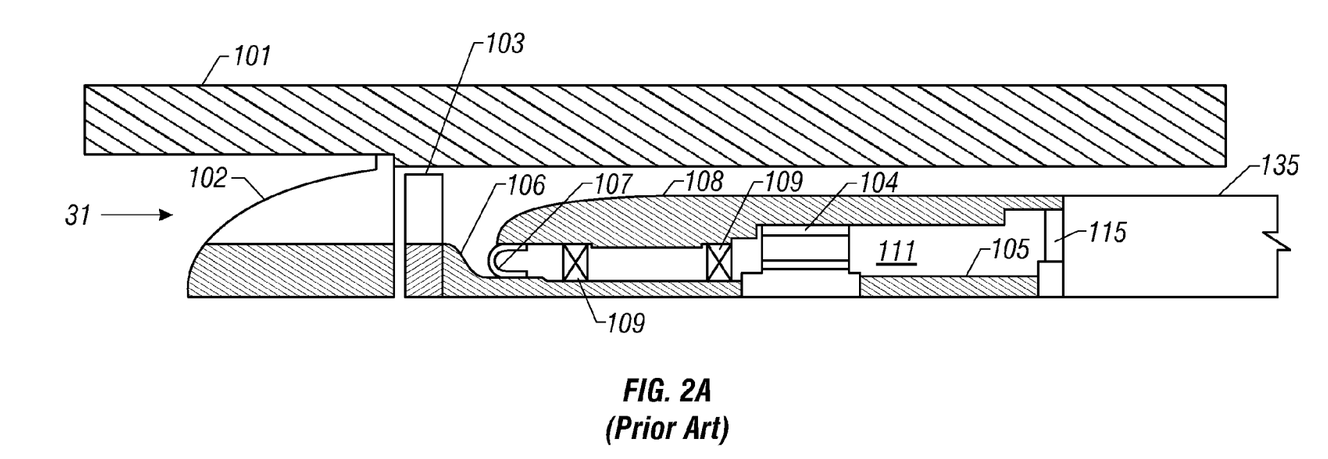
FIGS. 2A-2C (prior art) is a schematic of an oscillating shear valve suitable for use with the present disclosure.

FIG. 2A is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

Figure 2B:
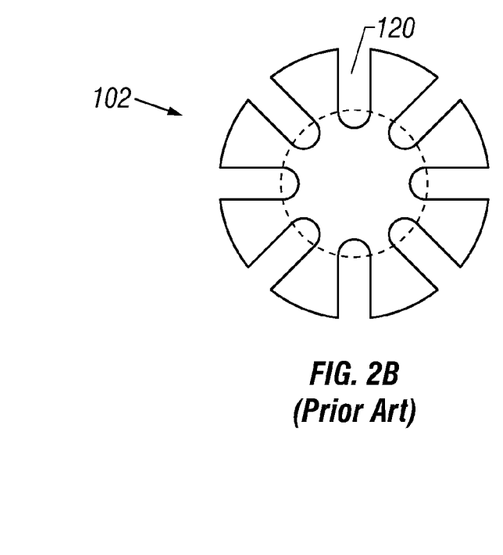
Figure 2C:
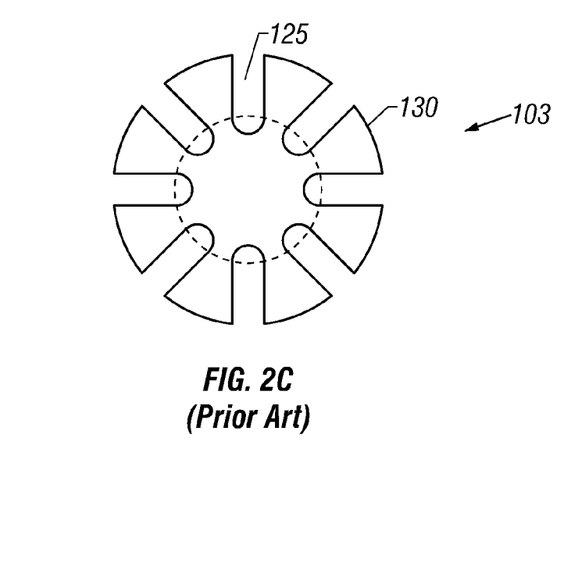

The stator 102, see FIGS. 2A and 2B, is fixed with respect to the tool housing 101 and to the pulser housing 108 and has multiple lengthwise flow passages 120. The rotor 103, see FIGS. 2A and 2C, is disk shaped with notched blades 130 creating flow passages 125 similar in size and shape to the flow passages 120 in the stator 102. Alternatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103 is. As an example, with eight flow openings on the rotor 103 and on the stator 102, an angular displacement of approximately 22.5° is used to create the pressure drop. This keeps the actuation energy relatively small at high pulse frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), or Phase Shift Keying (PSK) or the combination of these techniques.

In one embodiment of the disclosure, the tool housing 101 has pressure sensors, not shown, mounted in locations above and below the pulser assembly, with the sensing surface exposed to the fluid in the drill string bore. These sensors are powered by the electronics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In one embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate preferred embodiment, the seal 107 may be an elastomeric rotating shaft seal or a mechanical face seal.

In one embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

Figure 3:
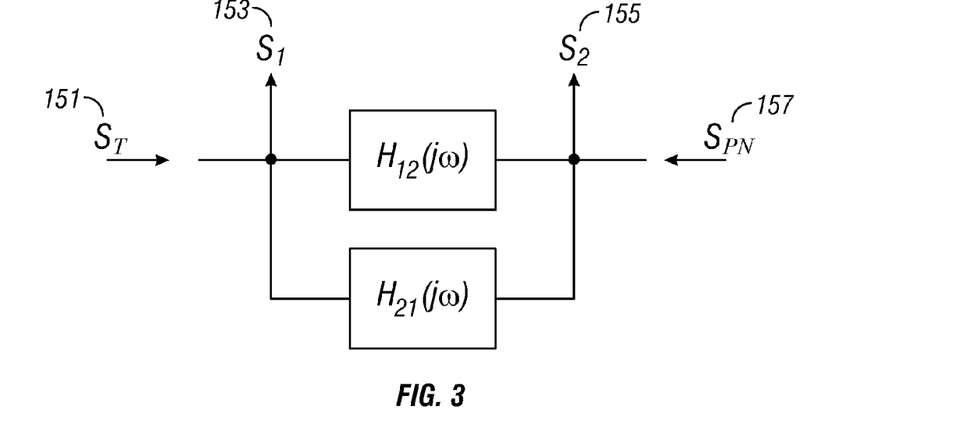
FIG. 3 is an illustration of the channel transfer function.

Turning now to FIG. 3, a block diagram showing the propagation of signals is shows. Denoted by 151 and 157 are the telemetry (message) signal $S_T$ and the pump noise $s_{PN}$. The signals are detected by two sensors $s_1$ and $s_2$ (153, 155 respectively). The mixture of the telemetry signal $S_T$ and pump noise $s_{PN}$, both signal waves traveling in opposite direction through the system with the transfer functions $H_{12}(j\omega)$ and $H_{21}(j\omega)$ for each direction, will be measured by two sensors as $$s_1(t)=s_T+F^{-1}(H_{21}(j\omega))*s_{PN},$$

$$s_2(t)=s_{PN}+F^{-1}(H_{12}(j\omega))*s_T \quad (1)$$

where $F^1$ is the inverse Fourier transform and * is the convolution operator. In a first step the impedance between these two sensors is evaluated in the absence of any telemetry signals $s_T(\Delta T)=0$ in a time interval $\Delta T$. This may be referred to as a "valve-off" condition. The complex impedance $I_{21}(j\omega)$ can be generated by Fourier transforming the signals $s_1(\Delta T)$, $s_2(\Delta T)$ and a division:

$$I_{21}(j\omega) = \frac{F(s_1(\Delta T))}{F(s_2(\Delta T))} = H_{21}(j\omega). \quad (2)$$

Next, a differential filtering of the signals is performed:

$$s_{out}=s_1-F^{-1}(I_{21}(j\omega))*s_2 \quad (3)$$

By the definition of $I_{21}$, this differential filtering will give a value of $s_{out}=0$ over the time interval $\Delta T$. This method may be called zero-forcing. Outside the time interval $\Delta T$, the differential filtering gives $$s_{out} = s_1 - I_{21}s_2 \quad (3)$$
$$= s_T + H_{21}s_{PN} - I_{21}(s_{PN} + H_{12}s_T)$$
$$= s_T(1 - H_{21}H_{12}).$$

In one embodiment of the disclosure, an assumption is made that $H_{21}=H_{12}$. With this assumption, the telemetry signal may be recovered as $$s_T = \frac{1}{(1-H_{21}^2)} s_{out}. \quad (4)$$

The term $$\frac{1}{(1-H_{21}^2)}$$

may be referred to as a model-based equalizer for the telemetry signal.

In another embodiment of the disclosure, instead of using zero-forcing, the filter is directly calculated by minimizing the error function $$\epsilon^2=(s_1-I_{21}^{LMS}*s_2)^2 \quad (5),$$

where the filter $I_{21}^{LMS}$ is obtained using the minimization procedure such as that described, for example, in "Adaptive Filter by G. Moschytz and M. Hofbauer, Springer Verlag, Berlin, October 2000". Using this filter, the differential filtered signal is:

$$s_{out}=s_1-I_{21}^{LMS}*s_2 \quad (6).$$

In another embodiment of the disclosure, no assumption is made about the relation between $H_{21}$ and $H_{12}$. Instead, a known reference signal is sent through the communication channel and the filter is calculated from the received signal. This results in equalization that includes the effect of the pulser, the mud channel, etc.

Figure 4:
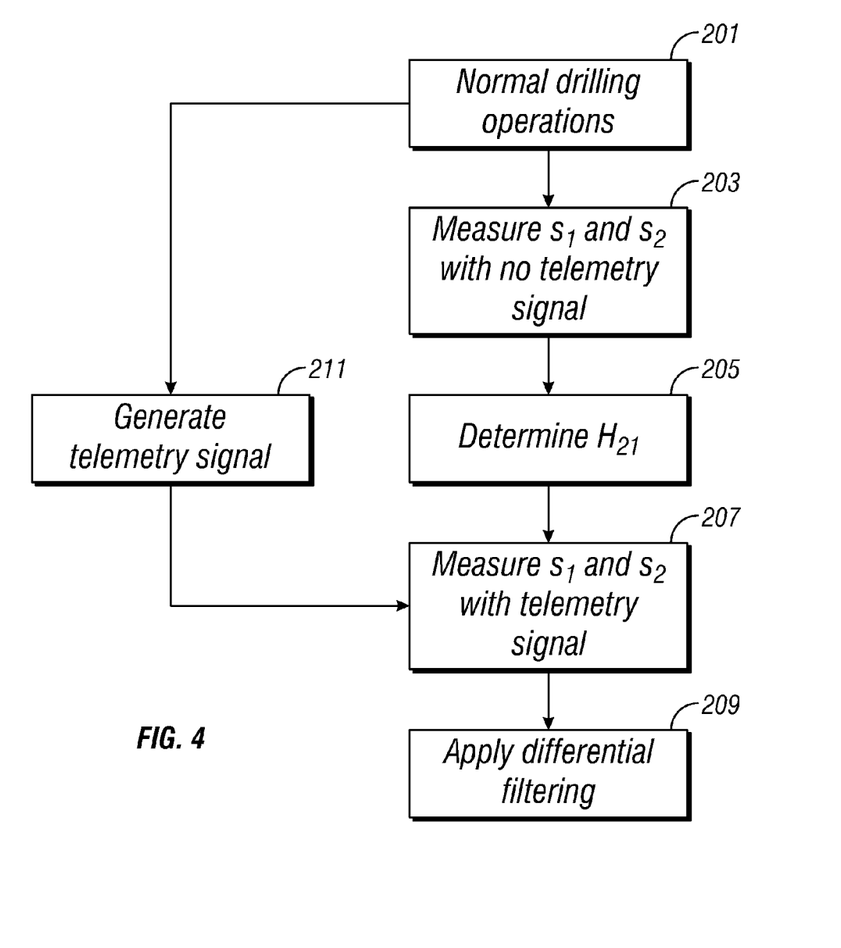
FIG. 4 is a flow chart of one embodiment of the method of the present disclosure.

A flow chart illustrating the method discussed above is given in FIG. 4. During normal drilling operations 201 the signals $s_1$ and $S_2$ are measured with no telemetry signal 203. The transfer function $H_{21}$ is determined 205 using eqn. (2). Measurements of $s_1$ and $s_2$ are then made with the telemetry signal 211 present 207. By applying the differential filtering 209 given by eqn. (3), eqn, the telemetry signal is recovered.

Figure 5:
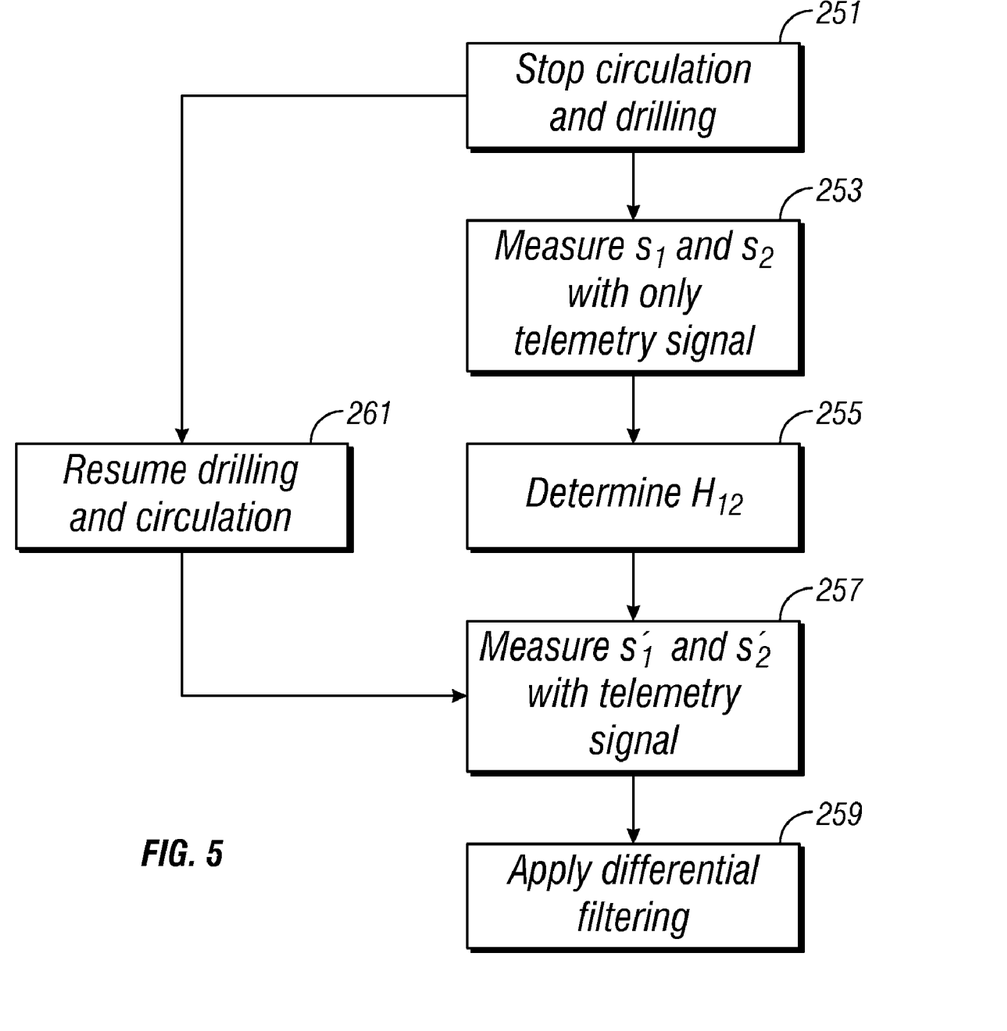
FIG. 5 is a flow chart of another embodiment of the method of the present disclosure.

In another embodiment of the disclosure, the assumption that $H_{21}=H_{12}$ is not made. Instead the impedance between these two sensors is evaluated in the absence of any pump noise $s_{PN}(\Delta T)=0$ in a time interval $\Delta T$. The complex impedance $I_{12}(j\omega)$ can be generated by Fourier transforming the signals $s'_1(\Delta T)$, $s'_2(\Delta T)$ and a division:

$$I_{12}(j\omega) = \frac{F(s'_1(\Delta T))}{F(s'_2(\Delta T))} = H_{12}(j\omega), \quad (7)$$

which gives a direct measurement of $H_{12}$, This is illustrated in the flow chart of FIG. 5. Circulation and drilling is stopped 251 and the signals $s'_1(\Delta T)$ are $s'_2(\Delta T)$ measured in the presence of only a telemetry signal 253. The transfer function $H_{12}$ is determined 255. Measurements of $s'_1$ and $s'_2$ are then made with the drilling and circulation resumed 261 and the telemetry signal present 257. By applying the differential filtering 259, the telemetry signal is recovered. An auxiliary power source such as a battery may be necessary to operate the downhole mud pulser when there is no mud circulating. As an alternative to the zero-forcing of eqn. (7), a least means square approach may also be used.

Figure 6A:
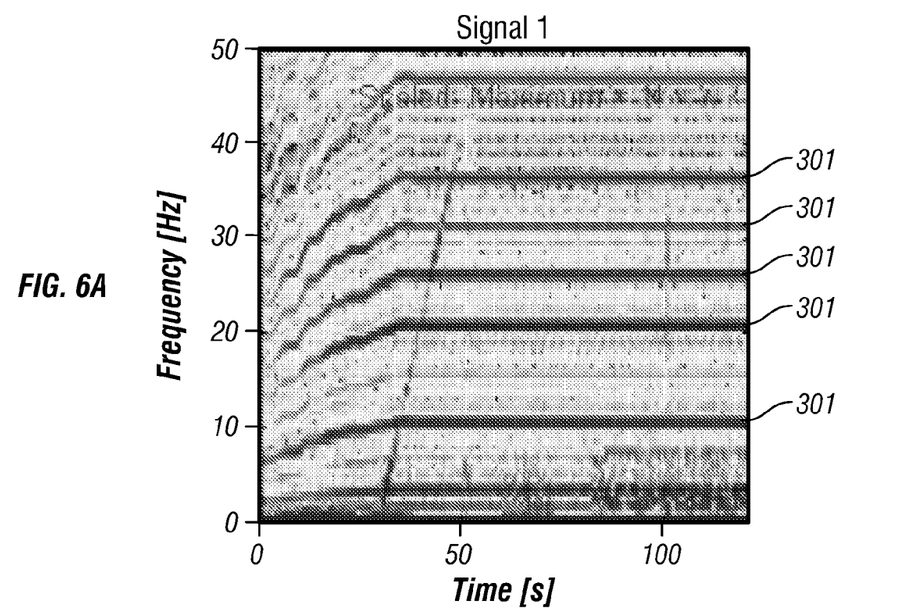
FIGS. 6A and 6B show exemplary signals measured at two spaced apart locations resulting from simultaneous activation of a message source and a noise source.
Figure 6B:
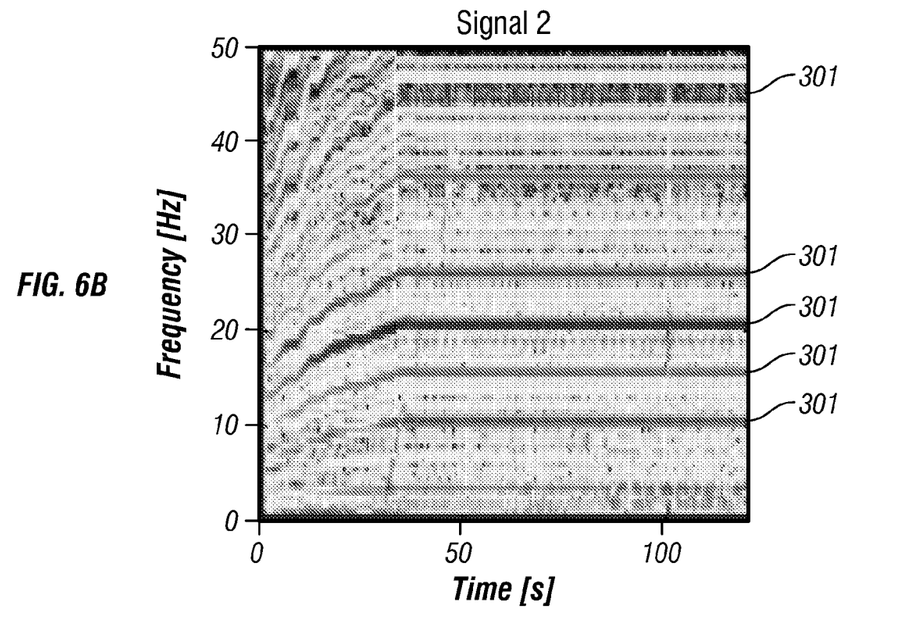
Figure 6C:
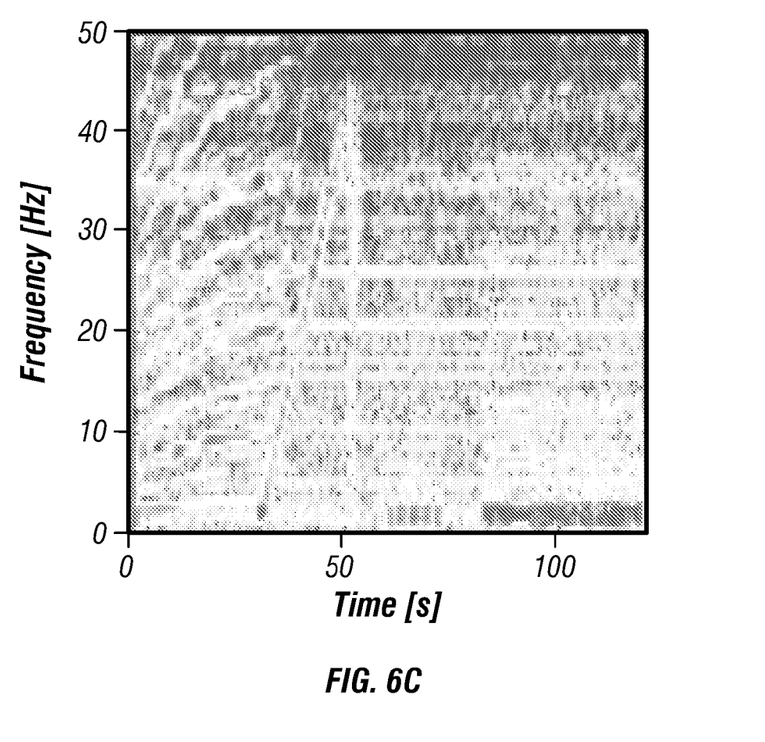
FIG. 6C shows the result of processing the signals of FIGS. 6A and 6B using the method of the present disclosure.

In yet another embodiment of the disclosure, the direction of flow may be reversed with only the pumps operating, and another estimate of the transfer function between the two sensors obtained. The pumps are connected to the Kelly hose to flow in the opposite direction FIGS. 6A and 6B show exemplary signals recorded with pump noise 301 present. The abscissa in both figures is time and the ordinate is frequency. A swept frequency telemetry signal was used. FIG. 6C shows the recovered spectrum of the telemetry signal after applying the method discussed above with the assumption that $H_{21}=H_{12}$. The reduction in the pump noise is significant.

An important part of the method of the present disclosure is the estimation of $H_{21}(\omega)$ or $h_{21}(t)$. As noted above, under the "valve-off" condition, $$H_{21}(j\omega) = \frac{S_1(j\omega)}{S_2(j\omega)}. \quad (8)$$

Experience showed that a valve-off signal of 10 seconds duration is adequate for proper calibration. However, there may be practical problems with identifying the "valve-off" condition reliably. Accordingly, another embodiment of the present disclosure does not require the making of measurements in the absence of a telemetry signal.

Measurements are made at two different times $t_1$ and $t_2$ as:

$s_1(t_1) = s_T(t_1) + h_{21}(t) * s_{PN}(t_1)$ $s_2(t_1) = s_{PN}(t_1) + h_{12}(t) * s_T(t_1)$ $s_1(t_2) = s_T(t_2) + h_{21}(t) * s_{PN}(t_2)$ $s_2(t_2) = s_{PN}(t_2) + h_{12}(t) * s_T(t_2) \quad (9).$ The four signals may be referred to as the first, second, third and fourth signals respectively. Subtracting the third signal from the first signal and the fourth signal from the second signal gives $s_1(t_1) - s_1(t_2) = s_T(t_1) - s_T(t_2) + h_{21} * (s_{PN}(t_1) - s_{PN}(t_2))$ $s_2(t_1) - s_2(t_2) = s_{PN}(t_1) - s_{PN}(t_2) + h_{12} * (s_T(t_1) - s_T(t_2)) \quad (10).$ If the telemetry signals at times $t_1$ and $t_2$ are the same, then $s_T(t_1) = s_T(t_2) \quad (11).$ This then gives $s_1(t_1) - s_1(t_2) = h_{21} * (s_{PN}(t_1) - s_{PN}(t_2))$ $s_2(t_1) - s_2(t_2) = s_{PN}(t_1) - s_{PN}(t_2) \quad (12).$ The telemetry signal has dropped out of the equations. The transfer function $H_{21}(j\omega)$ and $h_{21}(t)$ are then estimated as:

$$H_{21}(j\omega) = \frac{S_1^{t_1}(j\omega) - S_1^{t_2}(j\omega)}{S_2^{t_1}(j\omega) - S_2^{t_2}(j\omega)}. \quad (13)$$

The problem of detecting a "valve-off" condition has been changed to the problem of detecting two identical signals. This is a much easier problem to solve. For example, the same chirp signal may be sent as the telemetry signal at two different times. Chirp signals are easy to detect.

Figure 7:
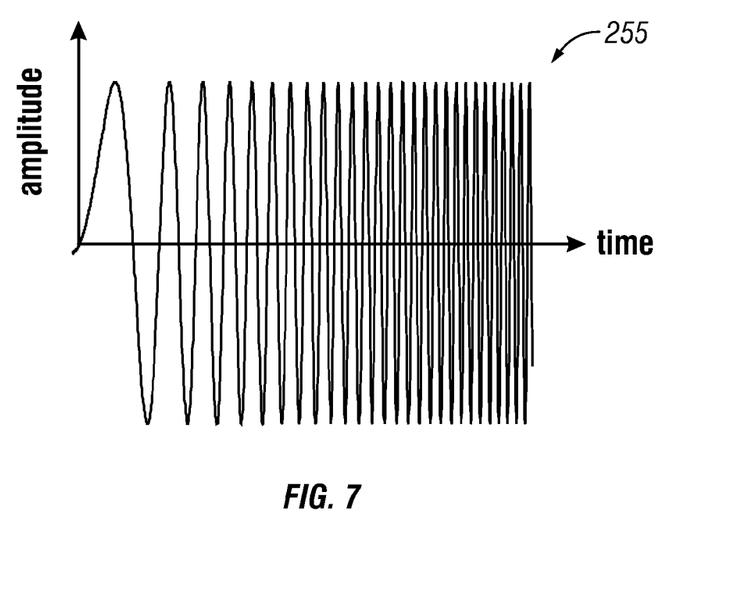
FIG. 7 shows an exemplary chirp signal.

An example of a chirp signal is one which occupies a period of time during which the frequency is increased or decreased continuously; it is a continuous frequency sweep between a start and an end frequency. In the time domain, an upsweep is illustrated by 255 in FIG. 7. Chirp signals are easily detected by cross-correlating with a reference signal which is a duplicate of the transmitted signal.

Figure 8:
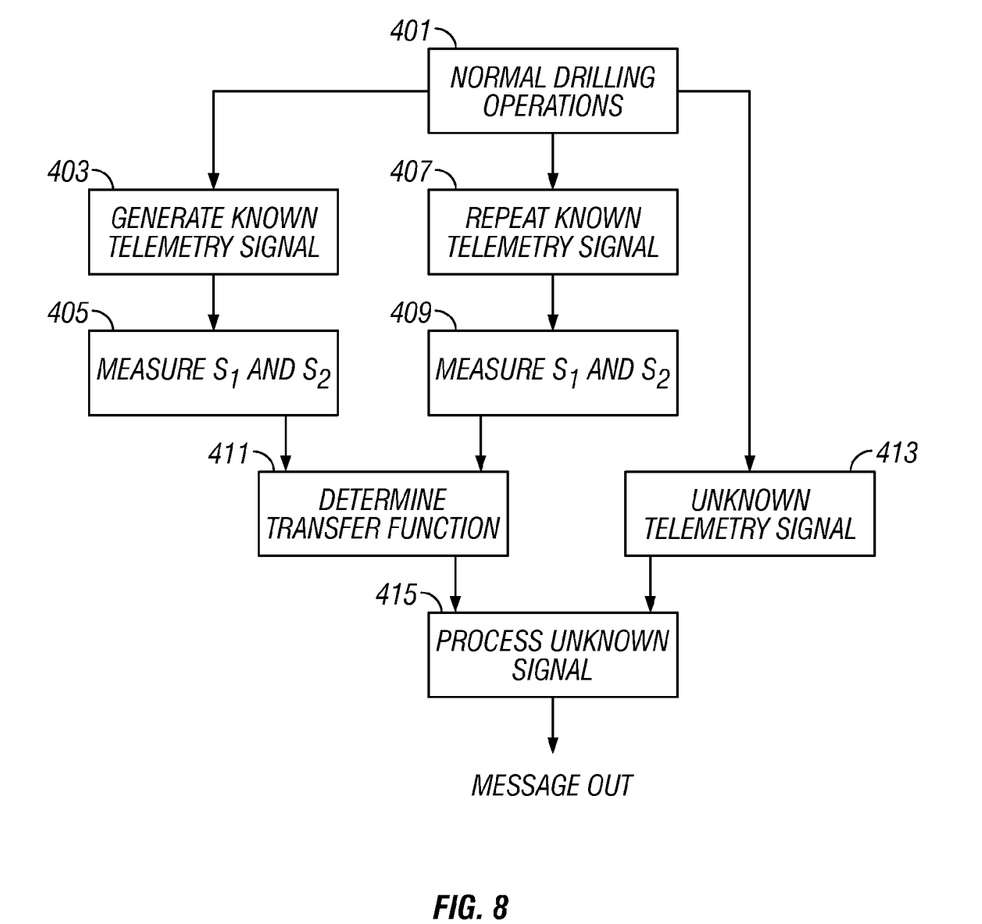
FIG. 8 shows a flow chart of en embodiment of the disclosure that does not use a valve-off condition.

FIG. 8 is a flow chart of the embodiment of the disclosure that does not require a valve-off condition. All measurements are made during normal drilling operations 401. At a first time $t_1$, a known telemetry signal such as a chirp signal is generated 403 and the signal $s_1$ and $s_2$ are measured 405. At a second time $t_2$ the chirp signal is repeated 407 and the signal $s_1$ and $s_2$ are measured 409. The signals measured at the second time may be referred to as additional signals. The transfer function $H_{21}$ is estimated 411 using eqn.(9) and may be recorded on a suitable medium. Subsequent unknown telemetry signals 413 can then be measured at the two sensors responsive to generation of the telemetry message at a third time to give fifth and sixth signals which are then processed 415 to give an estimate of the telemetry message using the determined transfer function $H_{21}$ as discussed above. The fifth and sixth signals may be referred to as more additional signals.

The use of two sensors is a special case of a situation when more than 2 sensors, say n sensors are used. In such a case, the relation between the signals $r_i(t)$ at the i-th sensor may be given by $$\vec{r}(t) = \begin{pmatrix} r_1(t) \\ \vdots \\ r_n(t) \end{pmatrix} = \underbrace{\begin{pmatrix} h_{11}(t) & h_{12}(t) \\ \vdots & \vdots \\ h_{n1}(t) & h_{n2}(t) \end{pmatrix}}_{H(t)} * \underbrace{\begin{pmatrix} s_T(t) \\ s_{PN}(t) \end{pmatrix}}_{\vec{s}(t)} + \underbrace{\begin{pmatrix} n_1(t) \\ \vdots \\ n_n(t) \end{pmatrix}}_{\vec{n}(t)}, \quad (14)$$

where the telemetry signal is $s_T$, the pump noise is $s_{PN}$, and $n_i$ are additive noises at the i-th sensor. The mixing of the telemetry signal is $s_T$, and the pump noise $s_{PN}$ by the matrix $H(t)$ gives the received signals. For the purposes of solution of eqn. (14), the pump noise is treated as a signal to be recovered.

Numerous algorithms addressing this problem (blind or semi-blind separation of convolutive mixtures, independent component analysis) exist in the literature. Signal separation can be achieved perfectly as soon as we have at least two receiver sensors. If we have a system of two sensors we can solve the system directly after the matrix identification (indirect approach). In case of more than two sensors we have to use minimization techniques (e.g. least square approach, that leads to calculation of the pseudo inverse of $H(t)$) to find the best solution for $s_T(t)$ and $s_{PN}(t)$.

The operation of the transmitter and receivers may be controlled by the downhole processor and/or the surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

What is claimed is:

1. A method of communicating a signal through a fluid in a borehole between a first location and a second location, the method comprising:
   (a) measuring signals in the fluid at at least two spaced apart positions at or near the second location in response to operation of a noise source and generation of a first message at a first time;

(b) measuring additional signals in the fluid at the at least two spaced apart positions in response to operation of the noise source and generation of the first message at a second time; and (c) estimating a characteristic of the fluid between the first location and a second location from the measured signals and the additional measured signals.

2. The method of claim 1 wherein the first message is generated at the first location.

3. The method of claim 1 further comprising:
(i) generating a message signal at the first location simultaneously with the operation of the noise source at a third time;
(ii) measuring more additional signals in the fluid at the at least two spaced apart positions; and
(iii) using the more additional signals and the estimated characteristic for estimating the message signal.

4. The method of claim 1 wherein the signals at the at least two spaced apart locations comprise at least one of (i) pressure signals, and (ii) flow rate signals.

5. The method of claim 1 wherein the characteristic of the fluid comprises a transfer function between the at least two spaced apart positions.

6. The method of claim 1 wherein generating the first message further comprises generating a swept-frequency signal.

7. The method of claim 3 wherein generating the message signal further comprises using at least one of (i) Amplitude Shift Keying (ASK), (ii) Frequency Shift Keying (FSK), and (iii) Phase Shift Keying (PSK).

8. The method of claim 1 further comprising conveying a source of the first message on a bottomhole assembly conveyed on a drilling tubular.

9. A system for communicating a signal through a fluid in a borehole between a first location and a second location, the system comprising:
(a) sensors in the fluid at at least two spaced apart positions at or near the second location configured to:
  (A) measure signals in response to operation of a noise source and generation of a first message by a message source at a first time; and
  (B) measure additional signals in the fluid in response to operation of the noise source and generation of the first message by the message source at a second time; and
(b) a processor configured to:
  (C) estimate a characteristic of the fluid between the first location and the second location from the measured signals and the additional measured signals; and
  (D) record the estimated characteristic on a suitable medium.

10. The system of claim 9 wherein the message source is at the first location.

11. The system of claim 9 wherein:
(i) the message source is configured to generate a message signal simultaneously with the operation of the noise source at a third time;
(ii) the sensors are configured to measure more additional signals in the fluid at the at least two spaced apart positions; and
(iii) the processor is configured to use the more additional signals and the estimated characteristic for estimating the message signal.

12. The system of claim 9 wherein the sensors are configured to be responsive to at least one of: (i) pressure signals, and (ii) flow rate signals.

13. The system of claim 9 wherein the characteristic of the fluid comprises a transfer function between the at least two spaced apart positions.

14. The system of claim 9 wherein the first message further comprises a swept-frequency signal.

15. The system of claim 11 wherein the message signal further comprises at least one of: (i) Amplitude Shift Keying (ASK), (ii) Frequency Shift Keying (FSK), and (iii) Phase Shift Keying (PSK).

16. The system of claim 9 wherein the message source is on a bottomhole assembly conveyed on a drilling tubular.

17. The system of claim 9 wherein the message source comprises an oscillating valve.

18. The system of claim 9 wherein the noise source comprises a pump.

19. A computer-readable medium for use with a system for communicating a signal through a fluid in a borehole between a first location and a second location, the system comprising:
(a) sensors in the fluid at at least two spaced apart positions at or near the second location configured to:
  (A) measure signals in response to operation of a noise source and generation of a first message by a message source at a first time; and
  (B) measure additional signals in the fluid in response to operation of the noise source and generation of the first message by the message source at a second time;
the medium comprising instructions which enable a processor to:
(b) estimate a characteristic of the fluid between the first location and the second location from the measured signals and the additional measured signals; and
(c) record the estimated characteristic on a suitable medium.

20. The machine readable medium of claim 19 further comprises at least one of (i) a ROM, (ii) an EPROM, (iii) an EAROM, (iv) a Flash Memory, and (v) an Optical disk.

* * * * *